July 23, 1968 — T. C. MASCARO — 3,393,751
TURF AERATING APPARATUS
Filed Oct. 10, 1966 — 2 Sheets-Sheet 1
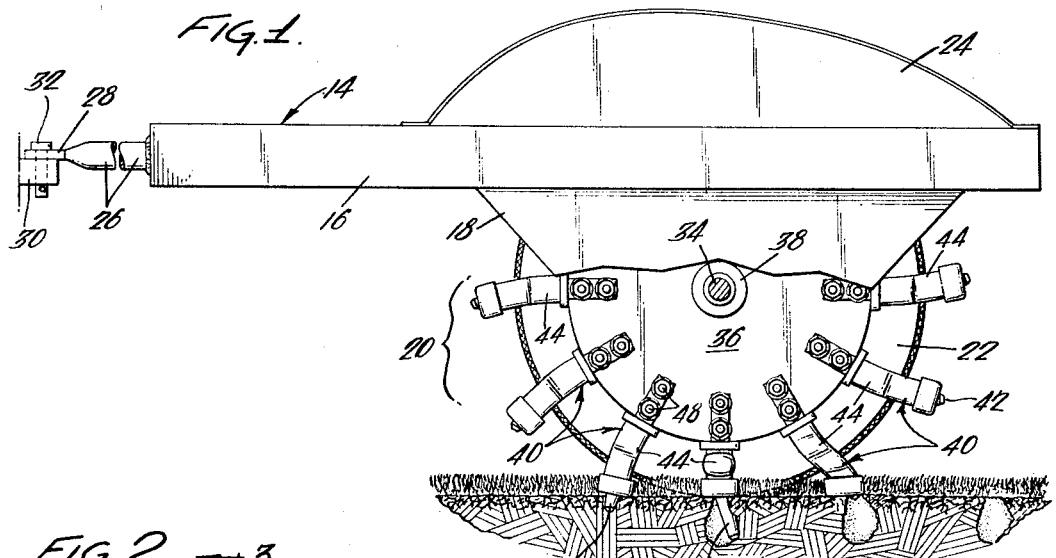
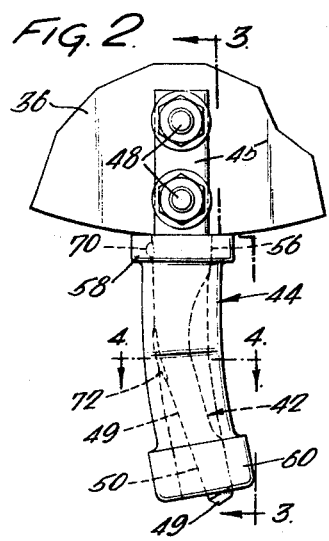
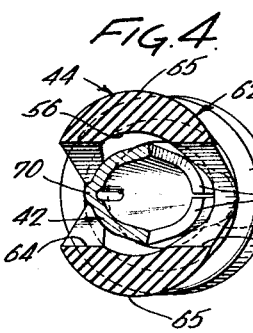
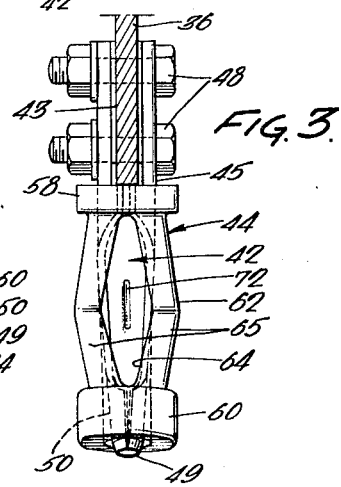
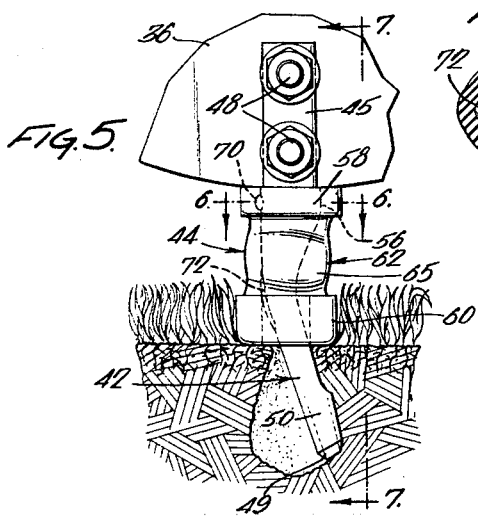
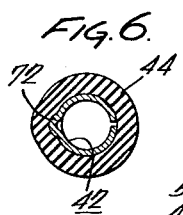
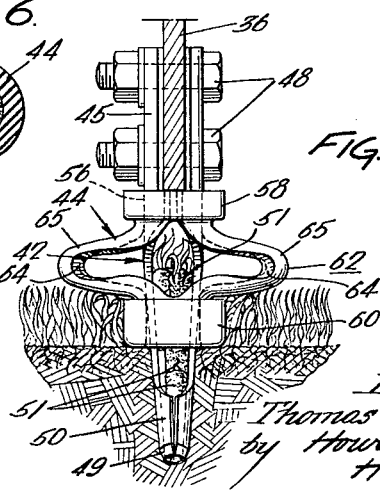
Inventor:
Thomas C. Mascaro
by Howson & Howson
Attys.

July 23, 1968     T. C. MASCARO     3,393,751
TURF AERATING APPARATUS
Filed Oct. 10, 1966     2 Sheets-Sheet 2
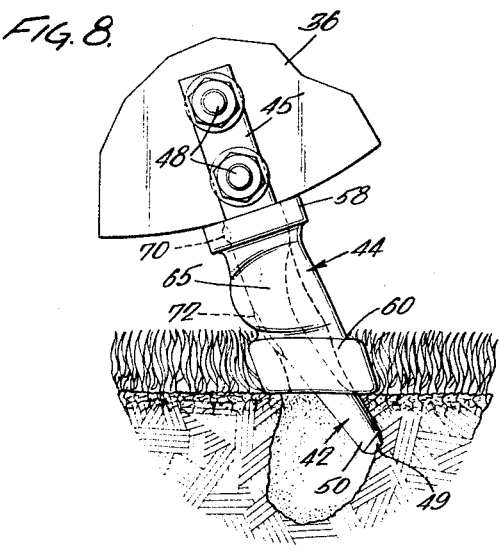
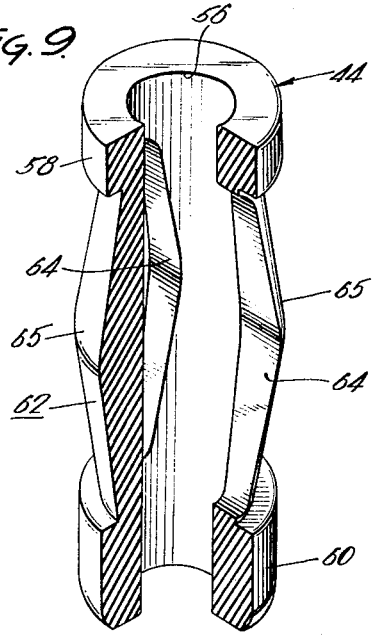
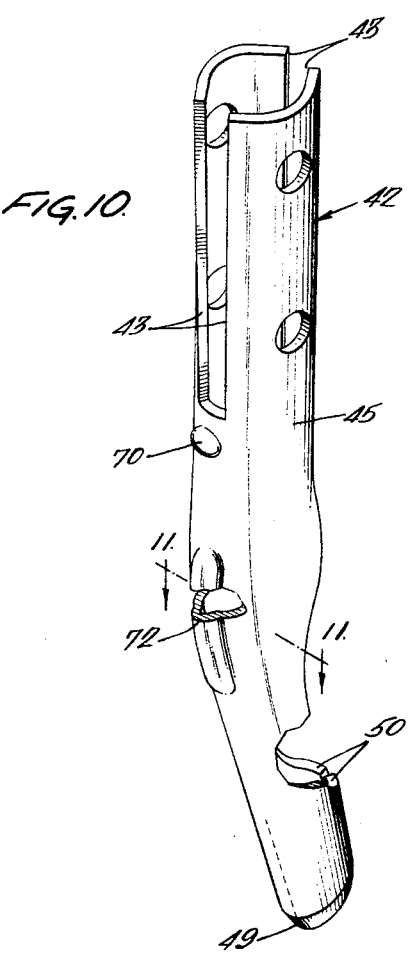
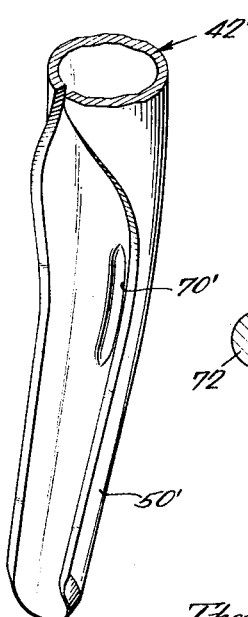
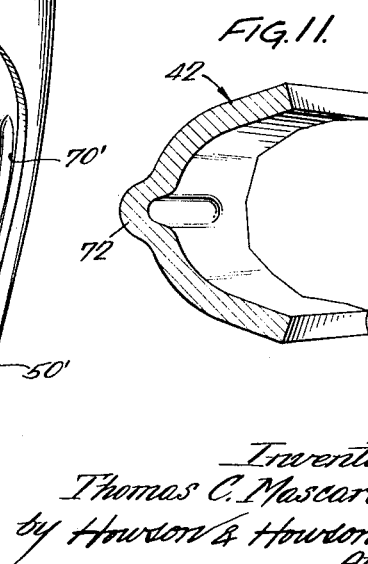
Inventor:
Thomas C. Mascaro
by Howson & Howson
Attys.

United States Patent Office 3,393,751
Patented July 23, 1968

3,393,751
TURF AERATING APPARATUS
Thomas C. Mascaro, West Point, Pa. 19486
Continuation-in-part of application Ser. No. 456,691,
May 18, 1965. This application Oct. 10, 1966, Ser.
No. 585,557
9 Claims. (Cl. 172—21)

ABSTRACT OF THE DISCLOSURE

An improved cultivating spoon assembly for turf aerating apparatus including a resilient turf-detaining element of an apertured tubiform construction which has a maximum resistance to compression in its elongated condition. The invention includes an improved cultivating spoon characterized by a longitudinal reinforcing rib on the curved transition portion of the spoon joining the shank and turf-engaging portions.

This application is a continuation-in-part of my copending application Ser. No. 456,691, filed May 18, 1965.

The present invention relates generally to turf aerating apparatus of the type adapted to remove small plugs of soil from the turf at spaced intervals to permit air, moisture and soil dressings to reach the grass roots. More particularly, the invention relates to an improved cultivating spoon assembly for such apparatus and includes a turf-detaining element of novel construction for preventing the tearing and raising of the turf upon withdrawal of the cultivating spoons.

The aeration of lawn turf is widely practiced, especially in the maintenance of golf course fairways and greens, to permit air, water, chemicals and fertilizer to reach the grass roots. At one time aeration involved the use of puncturing devices which formed spaced vertical openings by displacement of the turf. This treatment, however, actually rendered the turf less penetrable to the entrance of air, moisture and treating materials due to the compacting action of the displacing spikes or punches on the turf adjacent the openings. It is now generally acknowledged that for the most beneficial aeration, cores or plugs of turf must be removed in the forming of the openings. Apparatus for aerating turf by means of a turf plug removing operation are the subject of my U.S. Patent 2,580,236, issued Dec. 25, 1951, and my U.S. Patent 2,591,572, issued Apr. 1, 1952, in addition to my copending application referred to above.

In removing cores or plugs of turf, there is a tendency to disturb the turf in the vicinity of the openings, and further treatment may be required to restore a level lawn surface. The spoons or coring tines under certain conditions and especially with moist turf tend to lift and displace the matted turf in the vicinity of the plug opening during removal from the ground. The various arrangtments proposed in the above cited specifications for preventing the disturbance of the turf adjacent the openings include the use of spring-loaded strips or bearing plates which are biased against the lawn surface between the spoons or tines. In my U.S. Patent 2,591,572, coil springs are employed loosely surrounding the turf-removing spoons to bear against and prevent disturbance of the turf around the spoons during removal of the spoons from the soil.

Although such spring-loaded arrangements in large measure prevent the disturbance of the lawn surface which would take place in their absence, their operation is subject to improvement due to the inherent characteristics of springs which are contrary to the effect desired. Springs provide the least compressive force in their near-ly extended position while the maximum force is provided when they are fully compressed. The springs thus provide the lighest turf-restraining effect when extended during the removal of the spoons from the turf when the maximum restraining effect is actually needed. In addition, the force needed to fully compress the springs is to a large degree wasted and, in fact, impedes the penetrating stroke of the spoons.

In view of the above, it is a first object of the present invention to provide a turf detaining element for use with turf aerating spoons or coring tines which provides a maximum turf-detaining force around the turf opening during removal of the spoon or tine from the turf and which presents a substantially reduced compression force during the soil penetrating stroke of the spoon or tine.

A further object of the invention is to provide an improved turf detaining element as described loosely surrounding each spoon or tine which permits an unimpeded ejection of the turf plugs from the spoon or tine.

Another object of the invention is to provide a turf detaining element as described characterized by a simple, inexpensive construction and which may be easily mounted or removed from the aerating apparatus.

Still another object of the invention is to provide an improved turf aerating spoon of a novel, reinforced construction which is particularly adapted for use in conjunction with the present resilient turf detaining elements.

Additional objects and advantages of the present invention will be more readily apparent from the following detailed description of embodiments thereof when taken together with the accompanying drawings in which:

FIG. 1 is a side elevational view of a turf aerating apparatus embodying the novel resilient turf-detaining elements of the present invention, the device being broken away in part for clarity of illustration;

FIG. 2 is an enlarged elevational view showing one of the cultivating spoon assemblies of the device of FIG. 1;

FIG. 3 is a view partly in section taken along line 3—3 of FIG. 2;

FIG. 4 is a sectional view taken along line 4—4 of FIG. 2;

FIG. 5 is a view similar to FIG. 2 showing the compressed disposition of the resilient turf detaining element with the cultivating spoon fully entered into the turf;

FIG. 6 is a sectional view taken along line 6—6 of FIG. 5;

FIG. 7 is a view partly in section taken along line 7—7 of FIG. 5;

FIG. 8 is a view similar to FIG. 5 showing the disposition of the turf detaining element just prior to removal of the spoon from the turf;

FIG. 9 is a perspective view of a resilient turf detaining element with a portion thereof cut away to show the element in cross-section;

FIG. 10 is a perspective view of a cultivating spoon of the novel reinforced construction of the present invention;

FIG. 11 is an enlarged partial sectional view taken along line 11—11 of FIG. 10 showing the details of the reinforcing rib; and FIG. 12 is a perspective view of a modified form of cultivating spoon embodying the present reinforced construction.

Referring to the drawings, and particularly FIG. 1 thereof, an aerating apparatus broadly designated 14 of the general type described in detail in my U.S. Patent 2,580,236, is schematically shown and includes a horizontal frame structure 16 having side plates 18 from which depends the rotary aerating assembly 20. The apparatus is supported by pneumatic tires 22 which are vertically adjustable by suitable means (not shown) to permit adjustment of the depth of turf aeration and to permit transport of the apparatus without engaging the rotary aerating assembly 20 with the ground. A hood or cover 24 is provided above the rotary aerating assembly to restrict the flight of the turf plugs when the apparatus is operated at speed. A draw bar 26 extends from the forward end of the frame structure 16, terminating in an eyeplate 28 by means of which the apparatus can be attached to a tractor hitch 30 by means of pin 32.

The rotary aerating assembly 20 includes a shaft 34 journaled between the side plates 18 and on which are mounted a plurality of axially spaced discs 36, the discs being maintained in parallel relation perpendicular to the shaft axis by means of disc hub portions 38. Extending substantially radially from the circumference of each disc 36 are a plurality of uniformly spaced cultivating spoon assemblies 40 each of which includes a spoon 42 and a resilient turf-detaining element 44. The inner shank portion 45 of each spoon is of generally tubular cross-section and is slotted at 46 as shown in FIG. 3 to permit mounting of the spoon on the disc by means of the bolts 48.

The elongated turf-engaging portion 49 of the spoons extending outwardly of the discs 36 is of concave-convex construction having a substantially semi-circular cross-section. The spoons are mounted on the discs with the concave faces of the turf-engaging portions facing in the direction of spoon movement. The turf engaging portions are preferably tapered, becoming smaller toward their outer ends to permit ready extraction from the turf and release of the turf cores. The turf-engaging portion 49 is angularly disposed in the plane of the mounting disc with respect to the shank portion 45, the angle suitably ranging from 5° to 30° in the direction of spoon travel. The spoon tips, which are preferably rounded and sharpened, may be either of the closed type 50 shown for example in FIGS. 2, 3 and 10, or of the open type 50' shown in the modified spoon 42' of FIG. 12. The closed tip is usually preferred for turf having a thick thatch layer to provide a clean plug removal.

The structure thus far described with the exception of the resilient turf-detaining elements 44 which are considered at greater length below along with improved details of the cultivating spoon is conventional and is substantially the same as that disclosed in my U.S. Patent 2,580,236. The operation of this type of aerating apparatus and the benefits derived therefrom are fully set forth in this patent and will be only briefly considered as they pertain to the improvements of the present invention.

In operation, with the apparatus drawn from right to left as viewed in FIG. 1 by a suitable powered vehicle such as a tractor, and with the height of the tires 22 adjusted with respect to the rotary aerating assembly 20 so as to provide the desired penetration of the spoons into the turf, it can be understood that as the apparatus is moved along the turf, the spoons are sequentially moved into engagement with the turf as shown in FIGS. 1, 5, 7 and 8 to remove the turf cores or plugs 51 shown for example in FIG. 7, leaving spaced aeration openings 52 in the turf. The turf cores or plugs 51 are ejected from the spoons by the succeeding cores or plugs. For aerating relatively hard ground, it may be necessary to add weights to the frame structure 14 to insure the desired penetration of the spoons into the turf.

The improvements of the present invention are directed to the cultivating spoon assemblies and specifically to the novel resilient turf-detaining elements 44 as well as to novel structural features of the spoons which adapt the spoons for use with the resilient elements 44 and in addition provide a strengthening of the spoons in the area in which fatigue failure most frequently occurs.

The resilient turf-detaining element 44, which is preferably made of rubber or similar elastic material, as shown most clearly in FIG. 9 comprises a one-piece elastic elongated member having an axial bore 56 extending therethrough of a diameter equal to or slightly less than the diameter of the shank portions 45 of the cultivating spoons. The element includes a flange 58 at the upper end thereof and a larger flange 60 at the lower end thereof, said flanges being connected by a body portion 62 having a plurality of axially aligned slots 64 therein extending substantially the length of the body portion and dividing the body portion into body portion elements 65. In the preferred embodiment illustrated, a pair of slots 64 are provided in the body portion and, as illustrated in FIG. 3, are of a modified diamond shape to facilitate the outward deformation of the body portion elements during compression of the element 44 in the manner shown in FIG. 7. To further insure an outward movement of the body portion elements during compression, the wall thickness of the body portion elements is increased in the central region thereof as shown in FIG. 9 which, in view of the straight walled bore 56, results in an oppositely tapering outer configuration of the body portion elements.

In assembly, the turf detaining elements 44 are forced over the cultivating spoons 42 until the upper flanges 58 abut the edge of the disc 36, a slot 64 of each element being aligned with the plane of the disc 36 so that the turf cores or plug 50 may be ejected therethrough. Each element is held in place by the frictional fit of the flange 58 over the shank portion of the spoon and by the detent 70 thereon as shown in FIGS. 5 and 6, which also serves to prevent rotation of the element.

To strengthen the cultivating spoons in the region wherein fatigue failure most frequently occurs, a reinforcing rib 72 as shown most clearly in FIGS. 10 and 11 is provided on the forward convex face of each spoon. The rib 72 extends longitudinally along the curved transition region of the spoon joining the shank portion 45 and turf-engaging portion 49 which is normally between one-third to one-half way along the outboard extent of the spoon from the disc 36. The reinforcing rib 72 is most readily formed by displacing metal from the spoon wall as in the illustrated spoon embodiments. The provision of the reinforcing rib has provided an unexpectedly increased spoon life and substantially reduced maintenance time and expense. The reinforcing rib may, of course, be suitably employed either with the closed tip type spoon 42 illustrated for example in FIG. 10 or with the open tip type spoon illustrated in FIG. 12.

In the operation of the turf aerating apparatus using the novel turf detaining elements 44, the elements during the penetration stroke of the cultivating spoons are deformed in the manner shown in FIGS. 5 and 7, the body portion elements 65 bowing outwardly permitting the lower flange 60 to move upwardly along the spoon. The further the lower flange is forced upwardly along the spoon by the penetration of the spoon into the earth, the smaller the force required to hold the detaining element in the deformed position due to the bowed configuration of the body portion elements. As the spoon is withdrawn from the turf, as shown in FIG. 8, the lower flange 60 of the detaining element, due to the elasticity of the element, remains firmly in contact with the turf adjacent the opening 52 and exerts an increasing downward force on the turf as the length of the element approaches its natural length. The element provides a desirable maximum detaining force on the turf adjacent the opening as the spoon is withdrawn from the turf due to the increased leverage exerted by the resilient body portion elements 65 as they return to their normal longitudinal disposition. This effect is, of course, the opposite of that provided by a coil spring which provides a relatively slight force when nearly extended to its full length.

The present elastic turf detaining elements not only provide a maximum detaining force upon withdrawal of the spoons from the turf, but also provide the least resistance to compression when the spoons are at their maximum depth in the soil. A spring provides its maximum compressive force under these circumstances and thus works against the penetrating action of the spoons. This desirable characteristic of the elastic turf detaining elements is of particular importance in the reciprocating power driven aerating devices employing coring tines such as that illustrated in the copending application Ser. No. 456,691. While illustrated in the setting of a spoon type aerating apparatus, the present elastic turf detaining elements are also well adapted to the hollow coring tine reciprocating type aerating machines, particularly in view of this power saving advantage.

In view of their simple construction, the turf detaining elements are inexpensive to manufacture and may be easily removed and installed without tools of any kind. The operator of the aerating apparatus may thus immediately replace any damaged or worn out detaining elements in the field upon discovering that replacement is required.

Manifestly, changes in details of construction can be effected by those skilled in the art without departing from the spirit and the scope of the invention as defined in and limited solely by the appended claims.

I claim:

1. A turf cultivating spoon assembly for a turf aerating apparatus comprising, a cultivating spoon having a generally tubular-sectioned shank portion and a semicircular sectioned turf engaging portion extending from said shank portion, a turf detaining element comprising a unitary elastic elongated member having a bore extending longitudinally therethrough, said turf detaining element being mounted over said cultivating spoon with the spoon extending through said bore, said bore having a diameter providing a tight frictional fit of said spoon shank portion therewithin, said detaining element member comprising an elongated longitudinally compressible body portion, a plurality of apertures in said body portion permitting lateral expansion thereof upon longitudinal compression, and a flange on one end thereof overlying said spoon turf-engaging portion, said flange being adapted during penetration of the spoon into turf to resiliently engage the surrounding turf and maintain the level disposition thereof during withdrawal of the spoon from the turf.

2. A spoon assembly as claimed in claim 1 wherein said turf detaining element is of tubiform construction, the apertures of the body portion thereof including a plurality of longitudinal slots therein, and a detent on the shank portion of said cultivating spoon for preventing movement of the portion of said turf detaining element overlying the shank portion of said spoon with respect to said spoon.

3. A cultivating spoon assembly as claimed in claim 2, the turf engaging portion of said spoon being angularly disposed with respect to the shank portion thereof, said spoon being characterized by a curved transition portion joining the shank and turf engaging portions, and a longitudinally extending reinforcing rib on the longitudinally and laterally convex surface of said transition portion.

4. A turf detaining element for use with a turf cultivating spoon or coring tine comprising, a unitary elastic elongated member having a bore extending longitudinally therethrough adapting said member for mounting over a spoon or tine, said member comprising an elongated body portion, a plurality of apertures in said body portion permitting lateral expansion thereof upon longitudinal compression, and a flange on the lower end of said body portion, said flange being adapted during penetration of the spoon or tine into the turf to resiliently engage the surrounding turf and maintain the level disposition thereof during withdrawal of the spoon or tine, said body portion apertures providing a maximum resistance to longitudinal compression of the element in its normal elongated condition.

5. A turf detaining element as claimed in claim 4, said body portion being of a tubiform construction, the apertures thereof comprising a plurality of longitudinal slots.

6. A turf detaining element as claimed in claim 5, said member including an upper flange at the upper end of said body portion adapted to frictionally engage the shank portion of a cultivating spoon or coring tine.

7. A turf detaining element as claimed in claim 6, said slots extending substantially the length of said body portion and dividing said body portion into a plurality of body portion elements, said body portion elements having an increased thickness in the longitudinally central regions thereof resulting in an oppositely tapered outer configuration of said body portion.

8. A turf detaining element as claimed in claim 7, said slots in said body portion being substantially wider at their midpoints than at their ends.

9. In a cultivating spoon for a turf aerating apparatus having a generally tubular-sectioned shank portion, a semi-circular sectioned turf-engaging portion angularly disposed with respect thereto in the plane and direction of intended spoon travel, and a curved transition portion joining said shank and turf engaging portions, the improvement comprising a longitudinally extending reinforcing rib on the longitudinally and laterally convex surface of said transition portion.

References Cited
UNITED STATES PATENTS

| | | | |
|---|---|---|---|
| 2,591,572 | 4/1952 | Mascaro | 172—547 |
| 3,037,764 | 6/1962 | Paulsen | 267—63 |
| 3,147,964 | 9/1964 | Wolf | 267—63 |

ABRAHAM G. STONE, *Primary Examiner.*

J. R. OAKS, *Assistant Examiner.*